United States Patent [19]

Akeel

[11] Patent Number: 4,659,280
[45] Date of Patent: Apr. 21, 1987

[54] ROBOT WITH BALANCING MECHANISM HAVING A VARIABLE COUNTERBALANCE FORCE

[75] Inventor: Hadi A. Akeel, Sterling Heights, Mich.

[73] Assignee: GMF Robotics Corporation, Troy, Mich.

[21] Appl. No.: 692,995

[22] Filed: Jan. 22, 1985

[51] Int. Cl.⁴ .................................................. B66C 23/72
[52] U.S. Cl. .................................. 414/720; 16/289; 248/292.1; 901/48
[58] Field of Search .............. 414/719, 720; 901/48; 248/292.1, 280.1, 364, 123.1; 16/1 C, 289, 306

[56] References Cited

U.S. PATENT DOCUMENTS

| | | | |
|---|---|---|---|
| 2,726,914 | 12/1955 | Allen | 16/1 C |
| 2,940,459 | 6/1960 | Potterer et al. | 414/719 X |
| 3,850,307 | 11/1974 | Motoda | 901/48 X |
| 4,383,455 | 5/1983 | Tuda et al. | 248/292.1 X |
| 4,500,251 | 2/1985 | Kiryu et al. | 248/292.1 X |
| 4,546,233 | 10/1985 | Yasuoka | 414/719 X |

FOREIGN PATENT DOCUMENTS 2086976 12/1971 France .................. 901/48 X

Primary Examiner—Robert J. Spar
Assistant Examiner—Donald W. Underwood
Attorney, Agent, or Firm—Brooks & Kushman

[57] ABSTRACT

A robot including a balancing mechanism with a spring assembly which exerts a variable force to compensate for the gravitational moment transferred to the mechanism during relative rotation between an arm assembly of the robot and the rest of the robot about a pivotal axis. A spring of the spring assembly is chosen to have a force-deflection characteristic to account for the gravitational moment and the geometry of the mechanism. The arm assembly has a pivotal connection that pivotally supports the arm assembly on the rest of the robot for movement about the pivotal axis. The spring assembly has a longitudinal axis which extends towards and is substantially perpendicular to the pivotal axis. The moment arm is connected to the arm assembly at an attachment point offset from the pivotal axis. A first sprocket wheel is mounted on a drive gear of the arm assembly to rotate therewith and a second sprocket wheel is pivotally mounted at the free end of the spring assembly. A chain is wound about the first sprocket wheel to alternately wind and unwind during relative rotation about the pivotal axis. The opposite end of the chain is mounted to the gear to rotate therewith and an intermediate portion of the chain is trained over the second sprocket wheel.

7 Claims, 3 Drawing Figures

ROBOT WITH BALANCING MECHANISM HAVING A VARIABLE COUNTERBALANCE FORCE

TECHNICAL FIELD

The invention relates to robots having counterbalance mechanisms and, in particular, to robots having articulated and/or hinged arms which must be balanced to compensate for the effects of gravity.

BACKGROUND ART

Balancing for gravitational effects is usually required for hinged and/or articulated arm robots when such robots are likely to be activated manually or by some lower level power source. Such an occurrence typically takes place during teaching. Elimination or reduction of the effects of gravity allow the use of smaller power sources which reduces energy utilization and allows for better stability of servo-controlled mechanisms, such as the robot arm. With a balancer mechanism articulated arm robots can be designed so that they can be manually led through their desired tasks without the use of a prime mover and the complexity associated with the controller of the robot. As a result, the robot arm can be manually led through each desired task under low level power requirements.

The prior art shows numerous gravity balancing mechanism used on articulated arms and hinge mechanisms. One such arrangement utilizes counterweights for balancing the robot arm. However, the use of counterweights is oftentimes objectionable because of the added mass and resulting increase in arm inertia. For example, the inertia of a counterweight must be overcome every time the robot arm is to be moved in a different direction. Braking and change of direction of the robot arm is subject to inertial deceleration and acceleration forces due to the counterweights.

The following prior art patents disclose the use of counterweights as counterbalance mechanisms: the U.S. Pat. No. 2,344,108 to Roselund; the U.S. Pat. No. 3,543,989 to Cooper; and the U.S. Pat. No. 4,402,646 to Le Rouzo.

Other prior art patents disclose the use of hydraulic and pneumatic balancers of both the active and passive type. Active balancers require an external power source to supply or absorb the balancing energy. Passive balancers store and release the balancing energy as required. Many of such hydraulic or pneumatic counterbalance mechanism are relatively complex and costly. For example, the U.S. Pat. No. 4,229,136 to Panissidi, discloses an air pressure counterbalance system including an air-driven piston operated in the direction of the gravity axis as the manipulator hand is raised and lowered. The weights of different tools are programmed into computer memory and thereafter an air pressure regulator adjusts the counterbalancing force depending upon which tools are used by the manipulator.

Other U.S. patents which disclose hydraulic or pneumatic counterbalancing mechanisms include the U.S. Pat. No. 3,370,452 to Sack et al and Davini U.S. Pat. No. 4,300,198.

When balancing is required within a small angle or within a single quadrant (i.e. from a horizontal to vertically upward orientation) a level of balancing can be obtained with a spring or a passive pneumatic balancer. The following prior art patents disclose spring balancers which are useful within small angles of movement: the U.S. Pat. No. 3,391,804 to Flatau; the U.S. Pat. No. 4,024,961 to Stolpe; the U.S. Pat. No. 4,259,876 to Belyanin et al; the U.S. Pat. No. 4,283,165 to Vertut; and the U.S. Pat. No. 4,378,959 to Susnjara.

One objection to the use of conventional spring balancers is that the spring normally can only apply a variable force and there is normally no continuous and/or adequate compensation for the effect of varying gravitational forces. Also, it is inherent in most spring balancing methods that complete balance is possible only for one or two configurations of the arm and spring combination. As the robot arm moves away from that configuration in either of two possible directions, an unbalance is generated and progressively changes until the arm approaches a neutral orientation of zero gravitational movement.

Spring balancers currently do not provide an acceptable level of balancing over extended angular movement of the robot arm. Because of this, oftentimes there are high actuation power requirements to overcome the effects of gravity on the robot arm, especially if the robot arm is moved upwards. Such high actuation power requirements present a safety hazard if the mechanism should fall under the force of gravity when motor power is shut off. Consequently, such mechanisms are usually provided with brakes to alleviate that potential danger, or are overbalanced against gravity.

Spring stiffness, initial tensioning and anchor point location can be adjusted to give a higher degree of balance within a small angular displacement of the arm and also limit the maximum value of the unbalanced moment and/or its direction. Beyond that displacement the degree of unbalance grows relatively rapidly.

Despite the relative simplicity and relative inexpensiveness of conventional spring and passive pneumatic balancers, the balancers have generally not been able to overcome their current angular limitations.

DISCLOSURE OF THE INVENTION

An object of the present invention is to provide a robot with an improved balancing mechanism having a spring assembly which is chosen to have a force-deflection characteristic which accounts for the gravitational moment and the geometry of the mechanism.

Another object of the presnet invention is to provide a robot with an improved balancing mechanism that balances an arm assembly of a robot during an extended range of movement of the arm assembly.

Still another object of the present invention is to provide a robot with an improved balancing mechanism which, given its performance characteristics, is relatively inexpensive and simple.

In carrying out the above objects and other objects of the present invention, a robot constructed in accordance with the present invention includes an arm assembly having a pivotal connection that pivotally supports the arm assembly on the rest of the robot for movement about a pivotal axis. The robot also includes an energy-storing balancing mechanism mounted on the rest of the robot and including an spring assembly having a longitudinal axis. The spring assembly is connected to the arm assembly at an attachment point offset from the pivotal axis. The longitudinal axis extends towards and is substantially perpendicular to the pivotal axis. The effective length of the spring assembly varies during relative rotation about the pivotal axis. The amount of energy stored in the mechanism is dependent on the effective length of the spring assembly.

Preferably, first and second wheels and a loop for interconnecting the wheels with the arm assembly are provided. The first wheel is mounted on the arm assembly to rotate therewith and the second wheel is rotatably mounted on the free end of the spring assembly. The first and second wheels rotate during relative rotation about the pivotal axis.

Also, preferably, the loop comprises a link chain and the first and second wheels comprise sprocket wheels.

While not limited thereto, the balancing mechanism preferably includes a mechanical spring assembly for storing energy therein and biasing the second sprocket wheel away from the pivotal axis along the longitudinal axis. The longitudinal axis extends towards the pivotal axis during relative rotation about the pivotal axis. Alternatively, instead of a mechanical spring assembly, a passive pneumatic device may be provided.

Further in carrying out the above objects and other objects of the present invention an energy-storing balancing mechanism constructed in accordance with the present invention is adapted to be mounted on a robot and includes an elongated spring assembly having a longitudinal axis. The spring assembly is adapted to be connected to an arm assembly of the robot at an attachment point offset from a pivotal axis about which the arm assembly pivots relative to the rest of the robot. When so mounted, the longitudinal axis extends towards and is substantially perpendicular to the pivotal axis. The effective length of the spring assembly varies during relative rotation about the pivotal axis. The amount of energy stored in the mechanism is dependent on the effective length of the spring assembly.

The invention as constructed above provides a relatively inexpensive and simple way of balancing the arm assembly during extended angular movement of the arm assembly. The above construction also minimizes the need for high actuation power requirements to overcome the effects of gravity acting on the arm assembly.

Other advantages of the present invention will be readily appreciated as the same become better understood by reference to the following detailed description when considered in connection with the accompanying drawings.

BEST MODE FOR CARRYING OUT THE INVENTION

Figure 1:
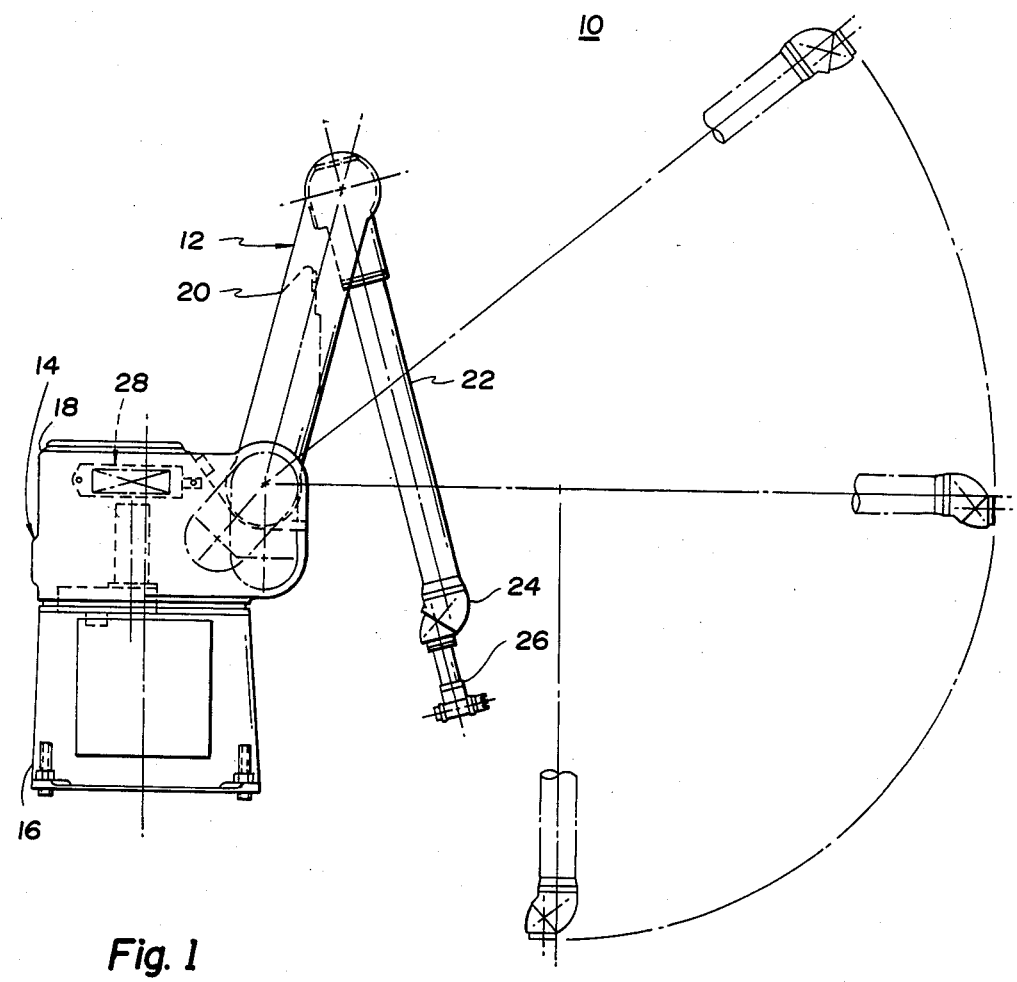
FIG. 1 is a side elevational view of a robot incorporating the present invention wherein different positions of an arm assembly are indicated by phantom lines.

Referring now to the drawings there is illustrated in FIG. 1 an articulated arm robot utilizing the invention as disclosed and claimed herein. The robot, collectively indicated at 10, includes an arm assembly, generally indicated at 12, which has a pivotal connection which pivotally supports the arm assembly on a base 14. The base 14 includes a relatively stationary bottom portion 16 and a pivotal top portion 18. The arm assembly 12 includes an inner arm 20 which is pivotally mounted on the top portion 18 of the base 14 and an outer arm 22 which is pivotally supported on the inner arm 20. Mounted at the free end of the outer arm 22 is a three-axis wrist mechanism 24 which is adapted to support a tool at its free end thereof, such as a paint spary gun 26.

The robot 10 also includes an energy-storing balancing mechanism, generally indicated at 28. While not shown, the mechanism 28 is preferably connected to the outer arm 22 to receive the gravitational moment experienced by the outer arm 22. The connection may be provided by a conventional four bar linkage or a chain drive.

Figure 2:
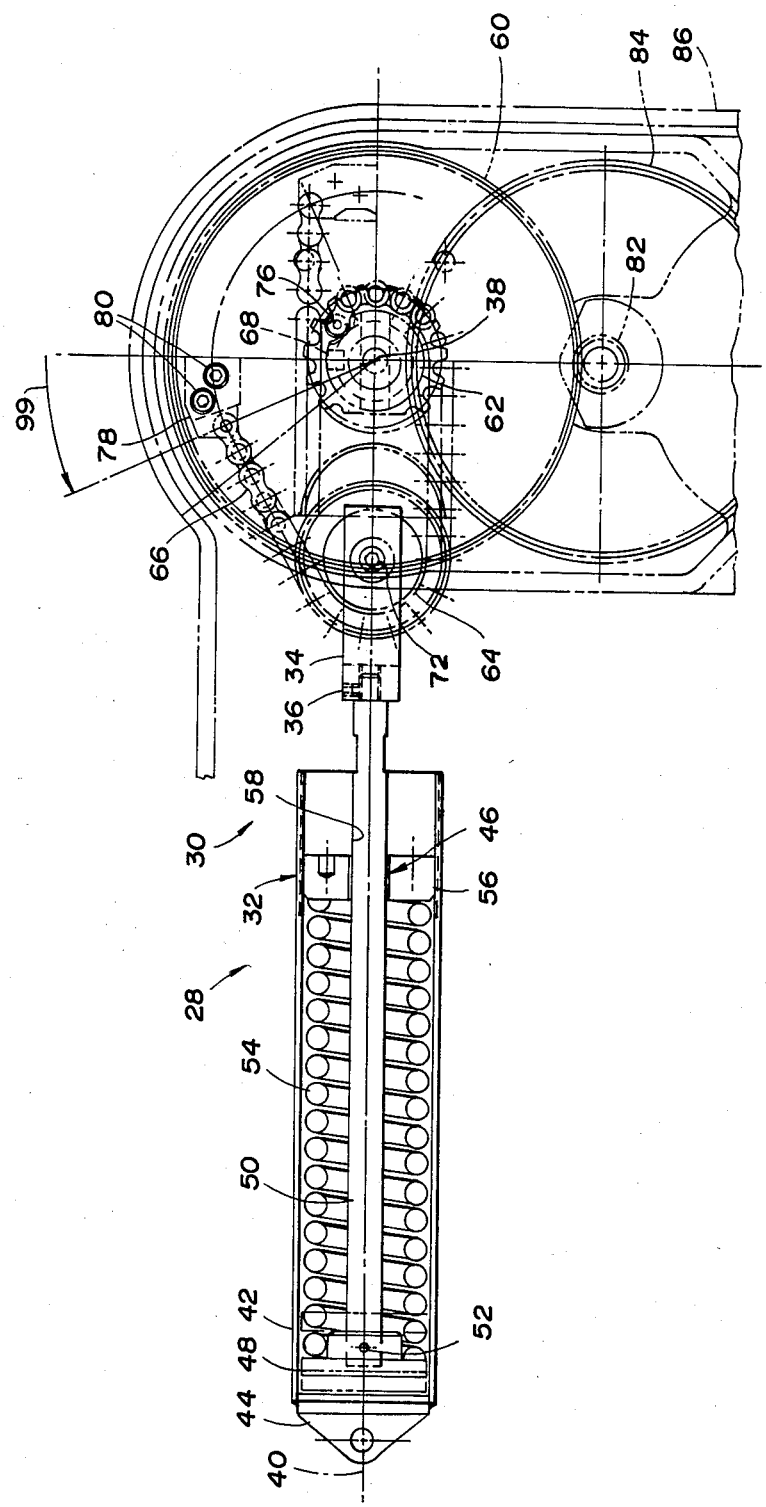
FIG. 2 is a side elevational view of a balancing mechanism constructed in accordance with the present invention, partially broken away to illustrate the component parts of the balancing mechanism and illustrating two operative positions.
Figure 3:
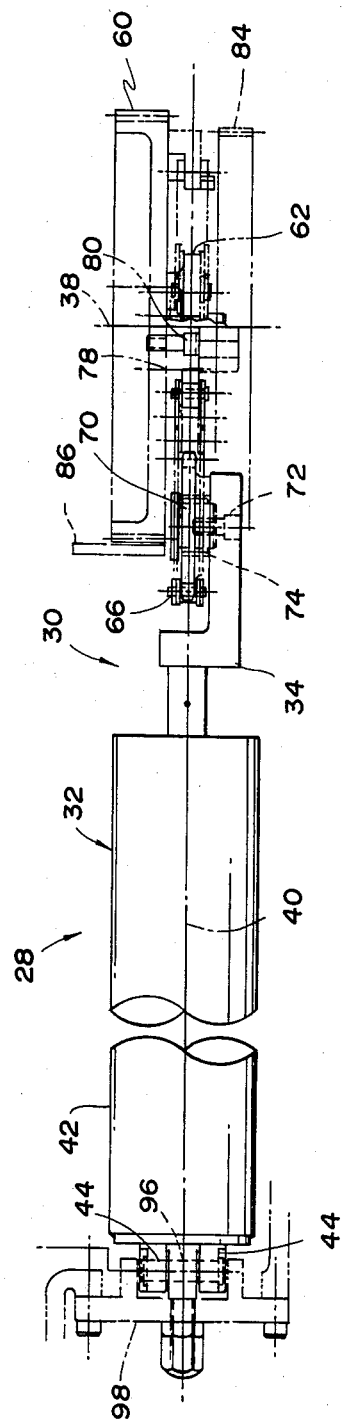
FIG. 3 is a top plan view, partially broken away, of the balancing mechanism of FIG. 2, wherein there is illustrated its attachment to the arm assembly at one end thereof and to the rest of the robot at its opposite end thereof.

The balancing mechanism 28 includes a spring assembly, generally indicated at 30 in FIGS. 2 and 3. The spring assembly 30 includes a spring member, generally indicated at 32 and a mounting block 34 fixedly connected thereto by a set screw 36. The spring member 32 stores balancing energy therein and biases the spring assembly 30 away from a pivotal axis 38 about which the arm assembly 12 rotates relative to the robot 10. The spring member 32 biases the spring assembly 30 away from the pivotal axis 38 along a longitudinal axis 40 of the spring assembly 30. The longitudinal axis 40 extends towards and is substantially perpendicular to the pivotal axis 38 during motion about the pivotal axis 38.

The spring member 32 includes a welded spring housing 42 having a pair of flanged end portions 44 through which a pin 96 extends and through a mounting bracket 98 of the rest of the robot 10, as shown in FIG. 3. The spring member 32 also includes a plunger, generally indicated at 46, which has a lower plunger portion 48 and a shaft 50 fixedly secured thereto by a grooved pin 52. The plunger 46 is biased towards the attachment pin 96, as shown in FIG. 2 by a spiral spring 54, which extends between the lower plunger portion 48 and a cap member 56 of the member 32 which is threadedly received at the opposite end of the spring housing 42. The shaft 50 extends through the coils of the spring 54 and an opening 58 formed through the cap 56 along the longitudinal axis 40 towards the pivotal axis 38.

The spring assembly 30 is connected to a drive gear 60 of the arm assembly 12 through a pair of sprocket wheels 62 and 64 and an interconnecting link chain 66. The sprocket wheel 62 is mounted on the drive gear 60 to rotate therewith by means of a key 68. The sprocket wheel 64 is rotatably mounted on the block 34 by a shaft 70 which is mounted to the block 34 by a screw 72. A needle bearing 74 rotatably supports the wheel sprocket 64 thereon as shown in FIG. 3.

One end of the link chain 66 is pivotally secured to the sprocket wheel 62 at a location 76 and held in position thereto. The link chain 66 is trained over the second sprocket wheel 64 and its opposite end is pivotally secured to the face of the gear 60 by a mounting link 78 which, in turn, is mounted by means of screws 80 to the face of the gear 60.

The gear 60 is driven through a pinion gear 82 which, in turn, is driven by a gear 84 since the gears 82 and 84 are mounted on the same shaft (not shown) to rotate therewith. The gear 84, in turn, is driven from a pinion gear (not shown) which is mounted on the drive shaft of a servo motor (not shown). The gears 60, 82 and 84 are housed within a drive housing 86 and drive the arm assembly 12 upon energization of the servo motor.

The link chain 66 alternately winds and unwinds on the sprocket wheel 62 during relative rotation between the arm assembly 12 and the rest of the robot 10 about the pivotal axis 38. In a wound position of the link chain 66, the plunger portion 48 is in its leftmost phantom line position as shown in FIG. 2. As the drive gear 60 rotates in a clockwise direction, the second sprocket wheel 64 functions as an idler wheel and moves with the spring assembly 30 and the link chain 66 to their rightmost positions, as also shown by phantom lines in FIG. 2. Movement of the chain 66 and the spring assembly 30 to their rightmost positions causes the plunger portion 48 to also move to its rightmost position, thereby compressing the coils of the spiral spring 54 between the plunger portion 48 and the cap 56. Therefore, it can be readily appreciated that the energy stored in the spring 54 depends on the effective length of the spring assembly 30 (i.e. the larger the distance between screw 72 and pin 96, the more energy is stored in the balancing mechanism 28).

As with all gravity balancing mechanisms, the effectiveness of this mechanism depends on the exchange of energy between the storage element, the spring, and the gravity moment of the balanced arm. The rightmost position of the block 34 corresponds to a zero gravitational moment applied to the gear 60 by a vertically hanging robot arm (i.e. neutral position of the arm). The leftmost position of block 34 corresponds to the same robot arm displaced upwardly to a position inclined by an angle 99 above horizontal. The total travel of a balanced arm can therefore be substantially above 90°.

The advantages of the above construction are many. Such advantages include extended balanced angular movement of the arm assembly 12. For example, the mechanism is effective in balancing the outer arm from a neutral or equilibrium position of hanging vertically downward to an unbalance position of being stretched horizontally. Furthermore, the mechanism is effective with a relatively small amount of unbalance for small angular movements beyond each of the above-noted limits.

In the illustrated preferred embodiment, the spring 54 is illustrated as an energy-storing element. The spring 54 is chosen to have a force-deflection characteristic that approximates the relationship between the force and the distance traveled. To choose the spring, the spacing between the sprockets, the sprocket diameter, the distance from the pivot axis that the link 78 is mounted and the gravitational moment on the outer arm must be considered.

It is to be understood that other energy-storing elements can also be utilized including a passive pneumatic device. The above-described invention can also be utilized in combination with an external power source as can be readily appreciated.

Another advantage of the invention is that it provides an almost complete balance for an overhung arm throughout its travel from a downwardly extending position to a position substantially above horizontal.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than has been described.

What is claimed is:

1. A robot comprising:
    an arm assembly having a pivotal connection that pivotally supports the arm assembly on the rest of the robot for movement about a pivotal axis;
    an energy-storing balancing mechanism including an open loop and an energy-storing member, the member having one end secured to the rest of the robot;
    first means for movably connecting the other end of the member to an intermediate portion of said loop to permit the intermediate portion of the loop to move during rotation of the arm assembly; and
    second means for connecting the ends of the loop to the arm assembly at a pair of attachment points offset from said pivotal axis, the member having a longitudinal axis extending towards and substantially perpendicular to the pivotal axis wherein the effective length of the member varies and the attachment points rotate about the pivotal axis during relative rotation of the arm assembly about the pivotal axis and wherein the amount of energy stored in the member is dependent on the effective length.

2. The robot as claimed in claim 1 wherein said energy-storing member includes a spring assembly and wherein said second means for connecting comprises a first wheel the first wheel being mounted on the arm assembly to rotate therewith and wherein said first means for connecting includes a second wheel being rotatably mounted on a free end of the spring assembly, said first and second wheels rotating during relative rotation about the pivotal axis to vary the effective length of the spring assembly and to vary the effective length of the loop.

3. The robot as claimed in claim 2 wherein said loop comprises a linked chain and wherein said first and second wheels comprise sprocket wheels, one end of the chain being wound about the first sprocket wheel to alternately wind and unwind during relative rotation about the pivotal axis, the opposite end of the chain being mounted on the arm assembly to rotate therewith about the pivotal axis, an intermediate portion of the chain being trained over the second sprocket wheel, the second sprocket wheel comprising an idler wheel.

4. The robot as claimed in claim 2 or claim 3 wherein said spring assembly includes a spring housing and single spring received and retained within said housing for storing balancing energy therein and for biasing the spring assembly away from the pivotal axis, said longitudinal axis extending towards said pivotal axis during relative rotation about the pivotal axis.

5. The robot as claimed in claim 4 wherein said spring comprises a spiral spring mounted within the spring housing and wherein said spring assembly further includes a plunger extending through said spring housing and the coils of said spring for compressing said spring during arm assembly motion in a first direction about the pivotal axis.

6. The robot as claimed in claim 2 wherein said first wheel comprises a drive gear pivotally mounted for rotation about the pivot axis and wherein said loop is connected to said drive gear at one of said attachment points for movement therewith about the pivotal axis.

7. An energystoring balancing mechanism adapted for use with a robot having an arm assembly and a pivotal connection which pivotally supports the arm assembly on the rest of the robot for movement about a pivotal axis, the mechanism including an energystoring member, an open loop, first means for movably connecting an intermediate portion of the loop to one end of the member and to permit the intermediate portion of the loop to move during rotation of the arm assembly and second means for connecting the ends of the loop to the arm assembly at a pair of attachment points offset from the pivotal axis, the member having a longitudinal axis extending towards and substantially perpendicular to the pivotal axis, wherein the effective length of the member varies and the attachment points rotate about the pivotal axis during relative rotation of the arm assembly about the pivotal axis and wherein the amount of energy stored in the member is dependent on the effective length.

* * * * *